(12) United States Patent
Wang et al.

(10) Patent No.: US 9,392,274 B2
(45) Date of Patent: Jul. 12, 2016

(54) INTER LAYER TEXTURE PREDICTION FOR VIDEO CODING

(71) Applicant: QUALCOMM Incorporated, San Diego, CA (US)

(72) Inventors: Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

(21) Appl. No.: 13/838,270

(22) Filed: Mar. 15, 2013

(65) Prior Publication Data

US 2013/0251030 A1    Sep. 26, 2013

Related U.S. Application Data

(60) Provisional application No. 61/614,450, filed on Mar. 22, 2012, provisional application No. 61/707,620, filed on Sep. 28, 2012.

(51) Int. Cl.
*H04N 7/26*    (2006.01)
*H04N 19/30*    (2014.01)
(Continued)

(52) U.S. Cl.
CPC ....... *H04N 19/00424* (2013.01); *H04N 19/105* (2014.11); *H04N 19/154* (2014.11);
(Continued)

(58) Field of Classification Search
CPC .......... H04N 19/00424; H04N 19/105; H04N 19/176; H04N 19/46; H04N 19/59; H04N 19/154; H04N 19/187; H04N 19/167; H04N 19/33; H04N 19/30

USPC ........................... 375/240.01, 240.03, 240.12
See application file for complete search history.

(56) References Cited

U.S. PATENT DOCUMENTS 8,175,158 B2    5/2012  Segall
2007/0014348 A1*    1/2007  Bao et al. ................... 375/240.1
(Continued)

FOREIGN PATENT DOCUMENTS

WO    2009099510 A1    8/2009

OTHER PUBLICATIONS

Hayase et al. "A Weighted Prediction of Spatial Scalable Video Coding with Inter-Layer Information ", 26, Picture Coding Symposium; Jul. 11, 2007-Sep. 11, 2007; Lisbon, 20071107, XP030080373; pp. 1-4.*

(Continued)

*Primary Examiner* — Christopher Kelley
*Assistant Examiner* — Zhihan Zhou
(74) *Attorney, Agent, or Firm* — Knobbe, Martens, Olson & Bear, LLP

(57) ABSTRACT

An apparatus for coding video information according to certain aspects is disclosed. Multi-layer video steams including a base layer and an enhancement layer can be coded. Predictors generated for the base layer and the enhancement layer can be combined to form a final predictor of the enhancement layer. Each predictor can be weighted such that those predictors which are more likely to produce high quality results can be factored more heavily in the final predictor. The conditions upon which the respective weights for enhancement layer predictors and base layer predictors are determined may be implicitly derived from the predictors or characteristics thereof. Alternatively, data may be generated explicating indicating the weights or providing information from which the weights can be determined.

37 Claims, 11 Drawing Sheets

(51) Int. Cl.

| | |
|---|---|
| *H04N 19/105* | (2014.01) |
| *H04N 19/176* | (2014.01) |
| *H04N 19/154* | (2014.01) |
| *H04N 19/187* | (2014.01) |
| *H04N 19/167* | (2014.01) |
| *H04N 19/46* | (2014.01) |
| *H04N 19/33* | (2014.01) |
| *H04N 19/59* | (2014.01) |

(52) U.S. Cl.
CPC ........... *H04N19/167* (2014.11); *H04N 19/176* (2014.11); *H04N 19/187* (2014.11); *H04N 19/30* (2014.11); *H04N 19/33* (2014.11); *H04N 19/46* (2014.11); *H04N 19/59* (2014.11)

(56) References Cited

U.S. PATENT DOCUMENTS

| | | | |
|---|---|---|---|
| 2007/0160133 A1* | 7/2007 | Bao et al. .................... | 375/240.1 |
| 2008/0056356 A1 | 3/2008 | Wang et al. | |
| 2009/0238279 A1 | 9/2009 | Tu et al. | |
| 2011/0293013 A1 | 12/2011 | Ma et al. | |

OTHER PUBLICATIONS

Kamp et al. "Quality Scalable Low Delay Video Coding Using Leaky Base Layer Prediction," Communications and Information Technologies, 2007, ISCIT '07 , International Symposium on, IEEE, Pi- Oct. 1, 2007, ISBN: 978-1-4244-0976-1; pp. 541-545.*

Schwarz. "CE8: Verification JVT-U043 SVC-to-AVC", 21. JVT Meeting; 78. MPEG Meeting; Oct. 20, 2006-Oct. 27, 2006; Hangzhou, CN; (Joint Video Team of ISO/IEC JTC1/SC29/WG11 and ITU-T SG.16), No. JVT-U117, Oct. 20, 2006, 3 pages, XP030006763.*

Bici O., et al., "Description of Scalable Video Coding Technology Propasal by Nokia (encoder configuration 1)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-TSG.16); URL: http://wftp3.itu.int/av-arch/jctvc-site/no.jvtcv-k0040, Oct. 1, 2012, XP030112972; pp. 1-13.

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-TSG.16); URL: http://wftp3.itu.int/av-arch/jctvc-site/no.jvtcv-k0036, Oct. 2, 2012, XP030112968; pp. 1-22.

Cui Y. et al., Local Adaptation of Leak Factor Alpha Based on Mode-Motion-Product of the Base-Layer Macroblocks in FGS Coding with Adaptative Reference, Image and Signal Processing, 2008, CISP'08, Congress ON, IEEE, Piscataway, NJ, USA, May 27, 2008, pp. 494-497, XP031287080, ISBN: 978-0-7695-3119-9.

Hayase K. et al., "A Weighted Prediction of Spatial Scalable Video Coding with Inter-Layer Information ", 26, Picture Coding Symposium; Jul. 11, 2007-Sep. 11, 2007; Lisbon, 20071107, XP030080373; pp. 1-4.

International Search Report and Written Opinion—PCT/US2013/033068—ISA/EPO—Jun. 7, 2013.

Kamp S. et al., "Quality Scalable Low Delay Video Coding Using Leaky Base Layer Prediction," Communications and Information Technologies, 2007, ISCIT '07, International Symposium on, IEEE, Pi—Oct. 1, 2007, ISBN: 978-1-4244-0976-1; pp. 541-545.

Kim S. H., et al., "Adaptive Multiple Reference Frame Based Scalable Video Coding Algorithm," International Conference on Image Processing (ICIP), vol. 2, Sep. 22, 2002; pp. 33-36, XP010607901, ISBN: 978-0-7803-7622-9.

Pandit P. et al., "Weighted Prediction in Scalable Video Coding," 25, Picture Coding Symposium; Apr. 24, 2006-Apr. 26, 2006; Beijing, 20060424, Apr. 24, 2006, XP030080342; pp. 1-6.

Schwarz H., et al., "Description of Scalable Video Coding Technology Proposal by Fraunhofer HHI (Configuration A)", 11. JVT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/no.jvtcv-k0042, Oct. 2, 2012, XP030112974; pp. 1-39.

Schwarz H., et al., "Overview of the Scalable Video Coding Extension of H.264/AVC Standard", IEEE Transactions on Circuits and Systems for Video Technology, IEEE Service Center, Piscataway, NJ, US, vol. 17, No. 9, Sep. 1, 2007, pp. 1103-1120, XP011193019, ISSN: 1051-5215, DOI: 10.1109/TCSVT.2007.905532.

Choi H.M., et al., "Scalable structures and inter-layer predictions for HEVC Scalable extension," 6. JCT-VC Meeting; 97. MPEG Meeting; Jul. 14, 2011-Jul. 22, 2011; Torino; (Joint collaborative team on video coding of ISO/IEC JTC1/SC29/WG11 and ITU-T SG.16); URL: http://wftp.3itu.int/av-arch/jctvc-site/,, No. JCTVC-F096, Jul. 1, 2011, 11 pages, XP030009119.

De Cock J., et al., "Architectures for Fast Transcoding of H.264/AVC to Quality-Scalable SVC Streams", IEEE Transactions on Multimedia, IEEE Service Center, Piscataway, NJ, US, vol. 11, No. 7, Nov. 1, 2009, pp. 1209-1224, XP011346646.

Schwarz H: "CE8: Verification JVT-U043 SVC-to-AVC", 21. JVT Meeting; 78. MPEG Meeting; Oct. 20, 2006-Oct. 27, 2006; Hangzhou, CN; (Joint Video Team of ISO/IEC JTC1/SC29/WG11 and ITU-T SG.16), No. JVT-U117, Oct. 20, 2006, 3 pages, XP030006763.

* cited by examiner

INTER LAYER TEXTURE PREDICTION FOR VIDEO CODING

CROSS-REFERENCE TO RELATED APPLICATIONS

This application claims priority under 35 U.S.C. §119(e) to U.S. Provisional Application No. 61/614,450 filed on Mar. 22, 2012, and to U.S. Provisional Application No. 61/707,620 filed on Sep. 28, 2012, the entire contents of both of which are incorporated by reference herein and made part of this specification for all that they disclose.

TECHNICAL FIELD

This disclosure generally relates to the field of video coding and compression, and more particularly, relates to scalable video coding (SVC) and techniques for inter-layer texture prediction.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

Generally described, this disclosure relates to scalable video coding. Aspects of the disclosure will be described with respect to the use of weighted base layer predictors and enhancement layer predictors in combination to generate a final predictor for an enhancement layer. In some examples, the weights may be constant for an entire slice, coding block, or bitstream. In additional examples, the weights for particular pixels, slices, coding blocks, etc. may vary. Factors that may be considered when determining varied weights include, among other things, the proximity of a pixel to a previously coded or decoded block, and intra-prediction direction. Other factors include quantization parameters and spatial scaling ratios.

In further examples, the conditions upon which the respective weights for enhancement layer predictors and base layer predictors are determined may be implicitly derived from the predictors or from characteristics thereof. Accordingly, no additional data needs to be transmitted to a decoder; rather, the decoder may dynamically derive the weighting. In still further examples, data may be included in the bitstream that the decoder may use to determine the weighting.

The details of one or more examples are set forth in the accompanying drawings and the description below. Other features, objects, and advantages will be apparent from the description and drawings, and from the claims.

DETAILED DESCRIPTION

Figure 1:
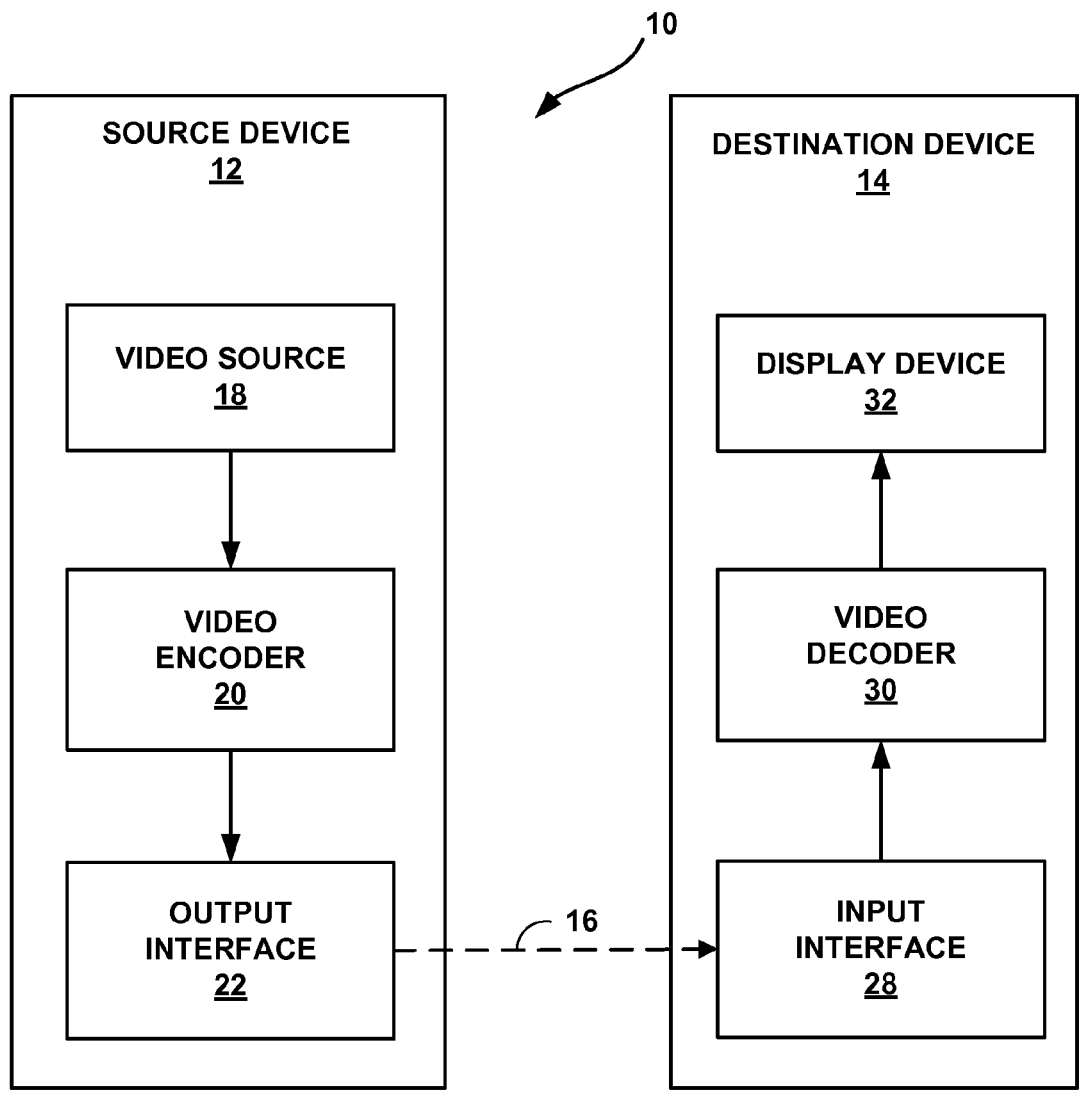
FIG. 1 is a block diagram of an illustrative video encoding and decoding system that may utilize techniques in accordance with aspects described in this disclosure.

Digital images, such as video images, TV images, still images or images generated by a video recorder or a computer, consist of pixels arranged in horizontal and vertical lines. The number of pixels in a single image is typically in the tens of thousands for smaller images and in the millions for high definition images. Each pixel typically contains luminance and chrominance information. Without compression, the quantity of information to be conveyed from an image encoder to an image decoder is so large that it can make real-time transmission impractical. To reduce the amount of information to be transmitted, a number of different compression methods, such as JPEG, MPEG, and H.263 standards, have been developed.

In a typical video encoder, the frame of the original video sequence can be partitioned into rectangular regions or blocks, which are encoded in Intra-mode (I-mode) or Inter-mode (P-mode). The blocks can be coded using some kind of transform coding, such as DCT coding. However, pure transform-based coding only reduces the inter-pixel correlation within a particular block, without considering the inter-block correlation of pixels and generally still produces high bit-rates for transmission. Current digital image coding standards also exploit certain methods that reduce the correlation of pixel values between blocks.

In general, blocks encoded in P-mode are predicted from one of the previously coded and transmitted frames. The prediction information of a block is represented by a two-dimensional (2D) motion vector. For the blocks encoded in I-mode, the predicted block can be formed using spatial prediction from already encoded neighboring blocks within the same frame. The prediction error, i.e., the difference between the block being encoded and the predicted block is represented as a set of weighted basis functions of some discrete transform. The transform is typically performed on an 8×8 or 4×4 block basis. The weights (e.g., transform coefficients) are subsequently quantized. Quantization introduces loss of information and, therefore, quantized coefficients can have lower precision than the originals.

Quantized transform coefficients, together with motion vectors and some control information, form a complete coded sequence representation and are referred to as syntax elements. Prior to transmission from the encoder to the decoder, syntax elements can be entropy coded so as to further reduce the number of bits needed for their representation.

At a video decoder, a block in a current frame can be obtained by first constructing its prediction in the same manner as in the encoder and by adding the compressed prediction error to the prediction. The compressed prediction error can be found by weighting the transform basis functions using the quantized coefficients. The difference between the reconstructed frame and the original frame is often referred to as reconstruction error.

The techniques described in this disclosure generally relate to scalable video coding (SVC) and 3D video coding. For example, the techniques may be related to, and used with or within, a High Efficiency Video Coding (HEVC) scalable video coding (SVC) extension. In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The latest joint draft of SVC and MVC is described in "Advanced video coding for generic audiovisual services," ITU-T Recommendation H.264, March 2010. In addition, there is a new video coding standard, High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent High Efficiency Video Coding (HEVC) text specification draft is available from http://phenix.int-evry.fr/jct/doc_end_user/documents/12_Geneva/wg11/JCTVC-L1003-v13.zip. Another recent Working Draft (WD) of HEVC, and referred to as HEVC WD9, is available at http://phenix.int-evry.fr/jct/doc_end_user/documents/11_Shanghai/wg11/JCTVC-K1003-v13.zip. Another working draft of HEVC, referred to as HEVC WD8 (or WD8) is available at http://phenix.int-evry.fr/jct/doc_end_user/documents/10_Stockholm/wg11/JCTVC-J1003-v8.zip. Another Working Draft of HEVC, and referred to as HEVC WD7 hereinafter, is available from http://phenix.int-evry.fr/jct/doc_end_user/documents/9_Geneva/wg11/JCTVC-I1003-v5.zip. All of these documents are incorporated by reference in their entireties.

In scalable video coding (SVC), bitstreams from each layer (e.g., a base layer and an enhancement layer) are multiplexed together into a single bitstream. Such a bitstream is scalable in a sense that enhancement layer bitstreams, when decoded, can provide certain enhancements to the base layer. Such enhancements include spatial resolution, temporal resolution, quality enhancements, and the like relative to the base layer. The base layer can be decoded independently from enhancement layers. Correspondingly, such enhancements are also referred to respectively as spatial scalability, temporal scalability and signal-to-noise ratio (SNR) scalability.

Regardless of the type of scalability, the goal of SVC is generally to utilize inter-layer correlation to improve coding efficiency. Such inter-layer correlation may exist in different syntaxes of corresponding blocks in different layers (e.g. prediction modes, motion vectors, prediction residuals, etc.).

To utilize such correlations, a number of coding tools have been proposed in the past. In the scalable extension of H.264/AVC, for example, several coding tools such as intra base layer (BL) mode, residual prediction, mode inheritance, and motion vector prediction are defined. In intra BL mode, the texture of a base layer reconstructed block is used as a predictor in predicting the corresponding enhancement layer block. With residual prediction, the prediction residual of a base layer block is used to predict the prediction residual of a corresponding enhancement layer block. With mode inheritance, the prediction mode (including partition mode) of a base layer block is used to predict the prediction mode of an enhancement layer block. With motion vector prediction, the motion vectors of a base layer block are used to predict the motion vectors of an enhancement layer block.

In SVC, whether a layer is a base layer or an enhancement layer can generally be viewed as relative. For example, any layer in between a first layer and a last layer may be an enhancement layer for one or more lower layers and at the same time may serve as a base layer for one or more higher layers.

SVC may be used to provide quality (also referred to as signal-to-noise (SNR)) scalability, spatial scalability and/or temporal scalability. An enhanced layer may have different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

Aspects of the present disclosure relate to using combined predictors, based on predictors from both the EL and BL, to generate a predicted EL block. In coding an EL, predictors may be generated as generally described above. Thereafter, the EL predictors may be combined with BL predictors in order to improve the quality of the final predictor that is used for inter-layer prediction of an EL pixel. In combining EL predictors and BL predictors, weighting may be applied such that the EL predictor affects the final predictor more than the BL predictor in cases where the EL predictor is likely to be more accurate. Alternatively, weighting may be applied such that the BL predictor affects the final predictor more than the EL predictor in cases where the BL predictor is likely to be more accurate. In cases where it is unknown which of the predictors is more likely to be accurate, the BL predictor and EL predictor may be weighted evenly.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
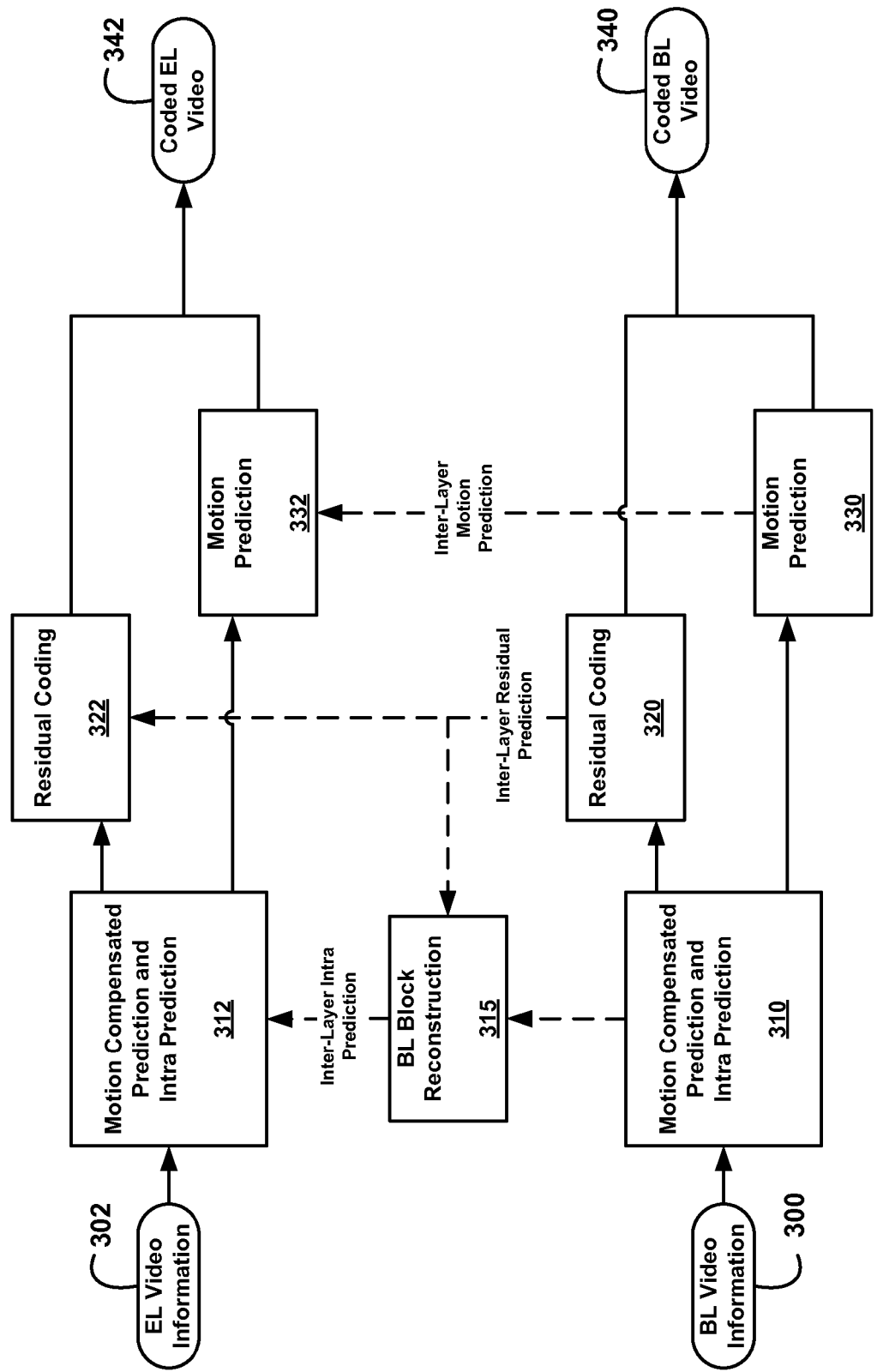
FIG. 2 is a flow diagram of an illustrative process for implementing the coding techniques described in this disclosure.
Figure 3:
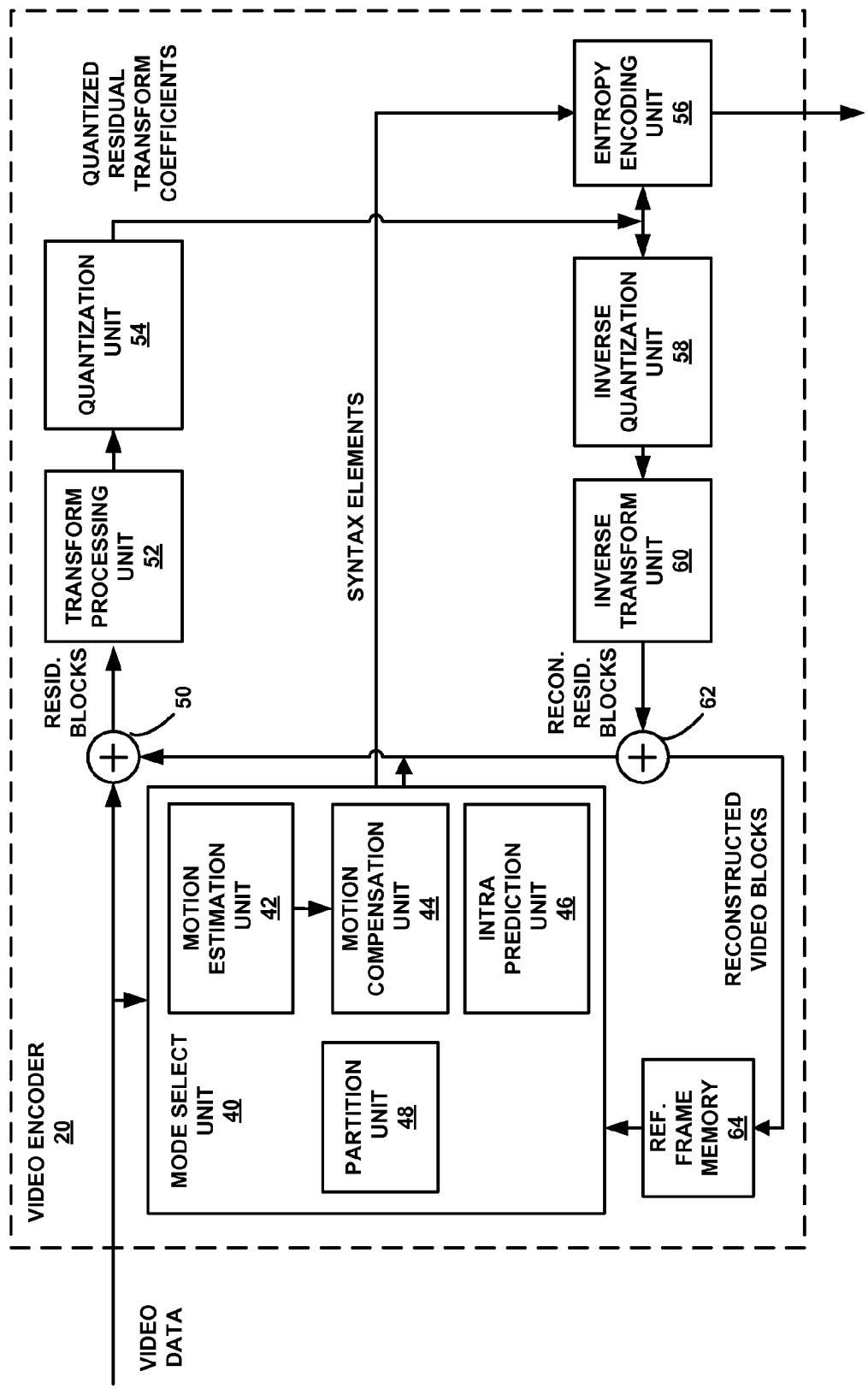
FIG. 3 is a block diagram illustrating an example video encoder that may implement the coding techniques described in this disclosure.
Figure 4:
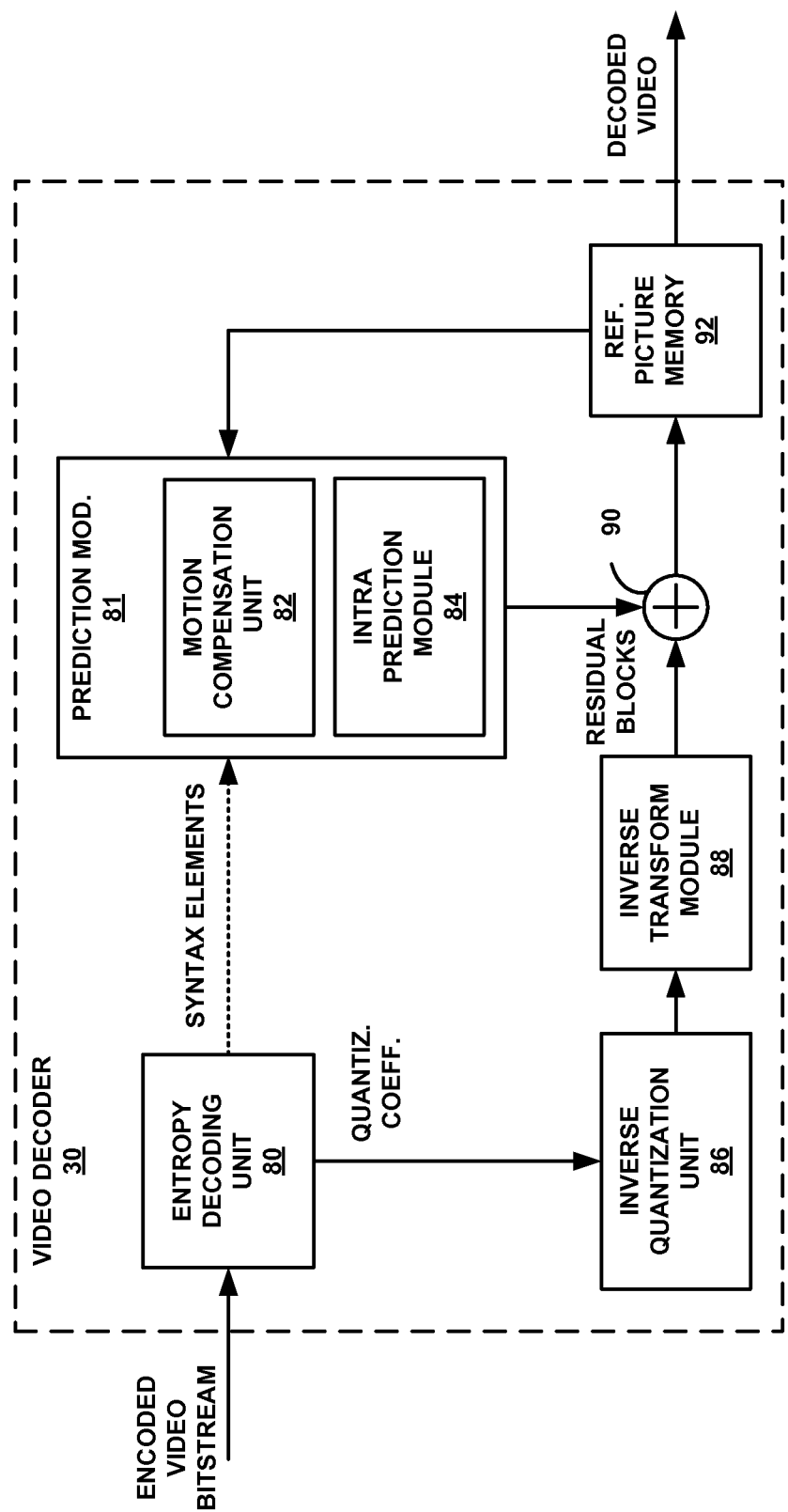
FIG. 4 is a block diagram illustrating an example video decoder that may implement the coding techniques described in this disclosure.

FIG. 2 illustrates an example process flow that may be implemented by various video coders, such as the video encoder 20 of FIG. 3, the video decoder 30 of FIG. 4, or some other video coder. In the following description, for convenience of illustration, the base layer block reconstructed texture is referred as the BL predictor (denoted as Pb). The predictor formed at the enhancement layer using information of enhancement layer blocks is referred as the EL predictor (denoted as Pe). The prediction formed by adaptive combination of both the BL predictor and EL predictor is referred as a final predictor (denoted as Pf) which is the one actually used to predict a current enhancement layer block, according to the techniques of this disclosure. The process illustrated in FIG. 2 can be used for combining BL predictors and EL predictors when generating inter-layer predictions.

Base layer video information 300 and enhancement layer video information 302 may be obtained by a video coder. At block 310, coding of base layer video, such as a BL block, may begin. A BL predictor (e.g., the reconstructed block at the base layer) may be generated according to motion compensated prediction, intra prediction, and residual prediction techniques described herein. At block 312, coding of enhancement layer video, such as an EL block, may also begin. An EL predictor may be generated according to motion compensated prediction and intra prediction. In addition, a BL predictor generated at block 310 may be combined with an EL predictor generated at block 312 in order to generate a final EL predictor. In generating the final EL predictor, weighting factors may be applied to the BL predictor and EL predictor in order to give more weight to the predictor that is more likely to be accurate, as described below.

In some embodiments, the first weighting factor can be constant for all pixels of the base layer predictor, and the second weighting factor can be constant for all pixels of the base layer predictor. In additional embodiments, the first weighting factor can vary as a function of pixel location and the second weighting factor can vary as a function of pixel location. In further embodiments, the weighting factors may vary based on quantization parameters or spatial scaling ratios. For any of the examples given, the weighting factors can be determined such that the sum of the first weighting factor and the second weighting factor is equal to a constant.

For example, for pixels at a border or close to the border of the current enhancement layer block (e.g., the EL block currently being coded), the second weighting factor, corresponding to the EL predictor, might be greater than the first weighting factor, corresponding to the BL predictor. Such weighting may be used in cases where adjacent pixels or pixels in close proximity to a pixel of the current EL block provide better predictors than pixels from a base layer. For pixels not at a border and not close to the border of the current enhancement layer block, the first weighting factor, corresponding to the BL predictor, can be greater than the second weighting factor, corresponding to the EL predictor. In these cases, it may be determined that pixels from the base layer block corresponding to the current enhancement layer block provide better predictors than pixels from other enhancement layer blocks. The determination of when a pixel is close enough to an adjacent enhancement layer block to affect the weighting applied to the predictors can be determined by the video coder based on an intra-prediction direction for the current enhancement layer block.

The video coder can also determine a first weighting factor as a function of a distance between a pixel and a border of the current enhancement layer block. The second weighting factor can generally increase for pixels closer to the border and the first weighting factor generally increases for pixels farther from the border.

The video coder can also determine the first weighting factor and the second weighting factor based on a quantization parameter of the base layer predictor and a quantization parameter of the enhancement layer predictor. For example, if the quantization parameter of the BL is the substantially equal to, or within some threshold of, the quantization parameter of the EL, then the weights of the BL predictor and EL predictor may be closer than if the difference in EL and BL quantization parameters is great. If the BL quantization parameter is much greater than EL quantization parameter, then weight that the video coder assigns to the EL predictor may be substantially greater than the weight assigned to the BL predictor (e.g., the weight assigned to the EL predictor increases as the difference QP1−QP2 increases, where QP1 represents the quantization parameter of the BL and QP2 represents the quantization parameter of the EL). Likewise, if the BL quantization parameter is much smaller than EL quantization parameter, then weight that the video coder assigns to the EL predictor may be substantially lower than the weight assigned to the BL predictor.

The video coder can also select the first weighting factor and the second weighting factor based on a scaling ratio. For example, larger scaling ratios can generally correspond to higher values for the second weighting factor.

At block 320, residual data representing pixel differences between the original BL block and the predictive BL block generated as described above may be coded. For example, when encoding video, the residual data may be transformed from the pixel domain to a transform domain, resulting in residual transform coefficients, which then may be quantized. At block 322, residual data representing pixel differences between the original EL block and the predictive EL block generated as described above may be coded.

At block 330, a predictor to a motion vector for the base layer may be generated according to motion prediction techniques, such as those described herein. At block 332, a predictor to a motion vector for the enhancement layer may also be generated according to motion prediction techniques. Additionally, the base layer motion vector may be used as a predictor for the enhancement layer motion vector.

At block 340, coded BL video may be output from the video coder. At block 342, coded EL video may be output from the video coder. When the process is performed by a video encoder, the BL residuals and other syntax elements may be entropy coded to further reduce the size of the resulting bitstream, and the EL residuals and other syntax elements may be entropy coded in similar fashion. The bitstreams corresponding to each layer may then be multiplexed for output (e.g., transmission or storage). When the process is performed by a video decoder, the coded EL video and BL video can be used to output a video signal for presentation (e.g., via a display associated with the decoder).

FIG. 3 is a block diagram illustrating an example of a video encoder 20 that may implement coding techniques in accordance with aspects described in this disclosure. Video encoder 20 may be configured to perform any or all of the techniques of this disclosure. As one example, mode select unit 40 may be configured to perform any or all of the techniques described in this disclosure, such as determining BL and EL weights based on pixel locations, BL and EL characteristics, and the like. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 3, video encoder 20 receives a current video block within a video frame to be encoded. In the example of FIG. 3, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate cost values from the distortions and rates for the various encoded blocks to determine which intra-prediction mode exhibits the best rate-distortion value (or the lowest cost value) for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In this manner, video encoder 20 of FIG. 3 represents an example of a video encoder configured to perform the techniques of this disclosure. For example, video encoder 20 can combine a base layer predictor and an enhancement layer predictor to form a final predictor, and perform inter-layer prediction for a current enhancement layer block based on the final predictor. Performing inter-layer prediction can include performing inter-layer texture prediction. When combining the base layer predictor and the enhancement layer predictor, video encoder 20 can assign a first weighting factor to the base layer predictor and assign a second weighting factor to the enhancement layer predictor.

FIG. 4 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure, such as determining BL and EL weights based on pixel locations, BL and EL characteristics, and the like. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 4, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 3A). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

In this manner, video decoder 30 of FIG. 4 represents an example of a video decoder configured to perform the techniques of this disclosure. For example, video decoder 30 can combine a base layer predictor and an enhancement layer predictor to form a final predictor, and perform inter-layer prediction for a current enhancement layer block based on the final predictor. Performing inter-layer prediction can include performing inter-layer texture prediction. When combining the base layer predictor and the enhancement layer predictor, video decoder 30 can assign a first weighting factor to the base layer predictor and assign a second weighting factor to the enhancement layer predictor. In some instances, the first weighting factor can be constant for all pixels of the base layer predictor, and the second weighting factor can be constant for all pixels of the base layer predictor.

The video decoder 30 can determine the weighting factors from, among other things, characteristics of the pixels within the enhancement layer blocks being decoded and characteristics of the BL predictors and EL predictors. The video decoder 30 may be configured to determine the weighting factors in a manner similar to that of the video encoder 20, described above. In this way, the video decoder 30 may determine the same or substantially similar weighting parameters that were used to encode video blocks without requiring additional data, such as data regarding which weights to use.

As described above with respect to the video encoder 20, the first weighting factor can vary as a function of pixel location and the second weighting factor can vary as a function of pixel location. For example, for pixels at a border or close to the border of the current enhancement layer block, the second weighting factor might be greater than the first weighting factor. For pixels not at a border and not close to the border of the current enhancement layer block, the first weighting factor can be greater than the second weighting factor. The determination of what constitutes close to the border can be determined by video decoder 30 based on an intra-prediction direction for the current enhancement layer block.

Video decoder 30 can also determine a first weighting factor as a function of a distance between a pixel and a border of the current enhancement block. The second weighting factor can generally increase for pixels closer to the border and the first weighting factor generally increases for pixels farther from the border.

Video decoder 30 can also determine the first weighting factor and the second weighting factor based on a quantization parameter of the base layer predictor and a quantization parameter of the enhancement layer predictor in a manner similar to that described above with respect to FIG. 3.

Video decoder 30 can also select the first weighting factor and the second weighting factor based on a scaling ratio. For example, larger scaling ratios can generally correspond to higher values for the second weighting factor.

Figure 5:
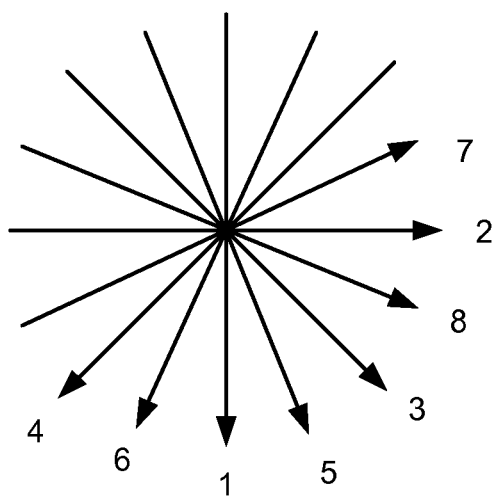
FIG. 5 is a diagram of illustrative intra-prediction modes.
Figure 6:
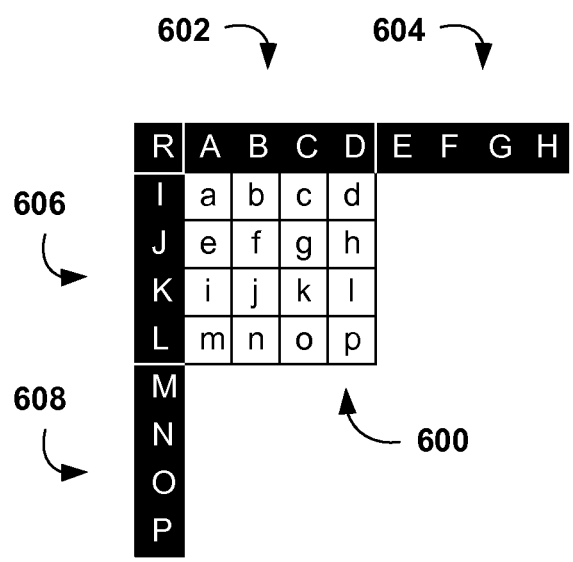
FIG. 6 is an illustrative representation of the prediction process.

Turning now to FIG. 5, an example of spatial prediction (i.e. intra prediction) used in a H.264 coder is described as follows. In order to perform the spatial prediction, the H.264 coder offers 9 modes for prediction of 4×4 blocks, including DC prediction (Mode 0) and 8 directional modes, labeled 1 through 8, as shown in FIG. 5. The prediction process is illustrated in FIG. 6. As shown in FIG. 6, the pixels from a to p in block 600 are to be encoded, and pixels A to R from neighboring blocks 602-608 have already been encoded and can be used for prediction. If, for example, Mode 1 is selected, then pixels a, e, i and m are predicted by setting them equal to pixel A, and pixels b, f, j and n are predicted by setting them equal to pixel B, etc. Similarly, if Mode 2 is selected, pixels a, b, c and d are predicted by setting them equal to pixel I, and pixels e, f, g and h are predicted by setting them equal to pixel J, etc. Thus, in this example, Mode 1 is a predictor in the vertical direction; and Mode 2 is a predictor in the horizontal direction.

The intra mode definitions and examples illustrated in FIGS. 5 and 6 are illustrative only, and not intended to be limiting. Other intra-mode definitions may be used, such as those in HEVC. In HEVC, the number of prediction modes is further increased. For example, 35 prediction modes are available respectively for 4×4 blocks, 8×8 blocks and larger. The mode index defined for each mode in HEVC may also be different. For example, in HEVC planar prediction is defined as Mode 0 and DC prediction as Mode 1.

In inter-layer texture prediction as described in intra-BL mode, the reconstructed texture from a base layer block can be used as a predictor to predict the texture of a corresponding enhancement layer block. In certain cases, however, not all of the pixels in the reconstructed texture from the base layer block are the best or preferred predictor for corresponding pixels in the enhancement layer block. Current schemes within the art do not offer the flexibility of using only a portion of the pixels or underweighting a portion of the pixels from a base layer in forming a predictor for an enhancement layer block. This disclosure describes techniques for enabling such flexibility to achieve better coding efficiency.

In some embodiments, a constant weighted combination of predictors may be used. According to such a technique, certain weightings can be assigned to an EL predictor, Pe, and a BL predictor, Pb, respectively when they are combined to form a final predictor Pf. Such weightings can be constant to all pixels within a predictor. For example, a final predictor may be formed based on the following equation.

$$Pf = c1*Pb + c2*Pe \quad (1)$$

In equation (1), c1 and c2 represent weighting coefficients. The sum of c1 and c2 can be equal to a constant, e.g. 1. Both c1 and c2 can remain constant for all pixels inside Pb and Pe.

In some embodiments, rather than using constant weighting, the weighting coefficients for each predictor can vary based on pixel location. For example, the weighting coefficients can be different for different pixel locations inside a predictor. More specifically the final predictor can be formed based on the following equation.

$$Pf[i,j] = c1[i,j]*Pb[i,j] + c2[i,j]*Pe[i,j] \quad (2)$$

In equation (2), i and j represent two-dimensional coordinates inside a predictor, indicating rows and columns respectively. Weighting parameters c1 and c2 can be different at different locations [i, j]. However, the sum of c1[i, j] and c2[i, j] can be equal to a constant, such as 1. Based on equation (2), if c1[i, j]=1 and c2[i, j]=0, the corresponding pixel in the final predictor is formed totally from the pixel in the BL predictor. Alternatively, if c1[i, j]=0 and c2[i, j]=1, then the corresponding pixel in the final predictor is formed totally from the pixel in the EL predictor.

In some embodiments, when the EL predictor is formed using intra prediction, pixels in the EL predictor that are located at the border of the current EL layer block (e.g., the block currently being coded) and close to a neighboring block of reconstructed pixels can be given higher weighting when they are combined with the BL predictor to form the final predictor. For other pixel locations, higher weighting may be given to pixels from the BL predictor.

Reconstructed pixels at the enhancement layer typically are more accurate (e.g., have a value closer to their original pixel values) than corresponding pixels at the base layer. As a result, in the EL predictor due to strong correlation among neighboring pixels, pixels located close to reconstructed pixels of a neighboring block may be used to generate higher quality predictions (e.g., the EL predictors may be given a higher weight than the corresponding BL predictors). However, for other pixels in the EL predictor that are located far away from the neighboring block reconstructed pixels that are used for prediction, the prediction quality may be lower in some instances. In these instances, BL predictors may be used to generate higher quality final predictors (e.g., the BL predictor may be given a higher weight than the corresponding EL predictors).

Figure 7:
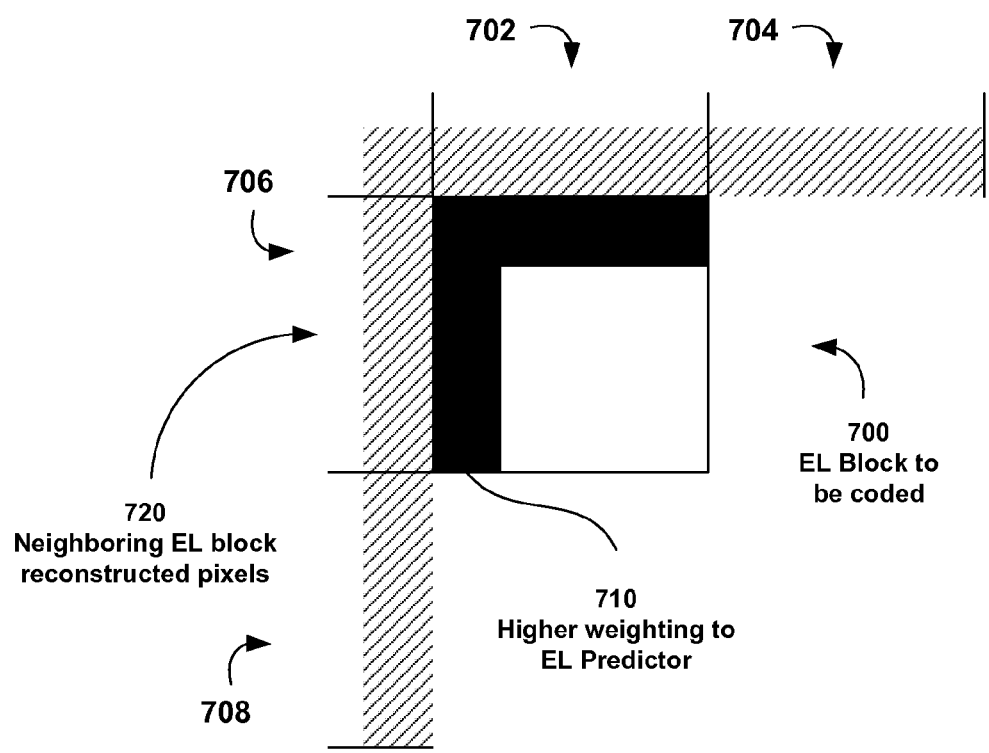
FIG. 7 is a diagram of an illustrative current enhancement block to be coded, where certain pixels of the current enhancement block are identified as being relatively close to the border of a neighboring block.

This idea is illustrated in FIG. 7. In FIG. 7, EL block 700 is the current EL block to be predicted and coded. The area 720 (marked with the "I" line-pattern) is the reconstructed pixel area of the neighboring EL blocks 702-708 that may be used for prediction of a current EL block 700. The area 710, shown shaded, is the area close to the neighboring EL blocks 702-708 where a relatively higher weighting may be assigned to the EL predictor. For example, based on equation (2), c1[i, j] may be less than 0.5 and c2[i, j] larger than 0.5 for pixels in the shaded area 710. For pixels on the border of the neighboring EL blocks 702-708 inside the shaded area 710, c1[i, j] may take a value of 0 and c2[i, j] a value of 1 so that the prediction value in the final predictor is totally based on the EL predictor for these pixels.

Figure 8A:
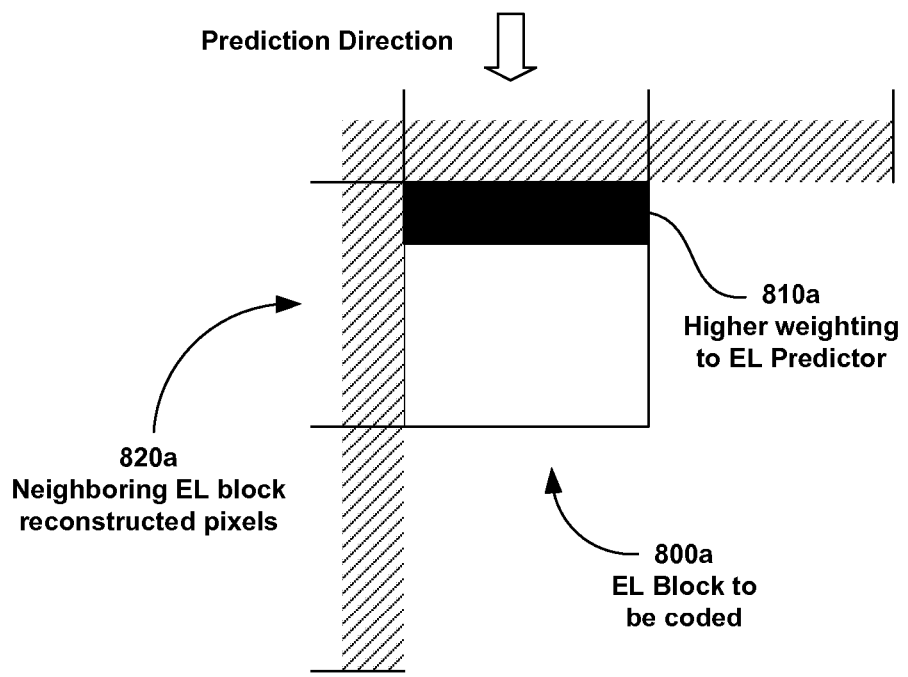
FIGS. 8A and 8B are diagrams of illustrative current enhancement blocks to be coded, where certain pixels of the current enhancement blocks are identified as being relatively close to the border of a neighboring block based on a prediction direction.
Figure 8B:
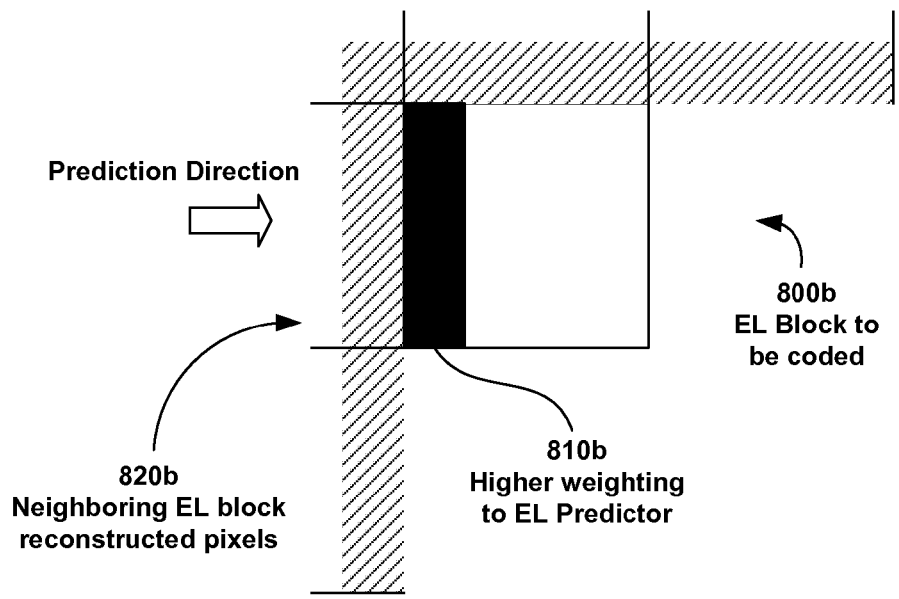

The case shown in FIG. 7 is an example only, and is not intended to be limiting. In practice, the shape of the shaded area 710 may be adaptively defined, for example based on an intra prediction direction selected for the current block 700. FIGS. 8A and 8B illustrate two other examples where the shaded area may be defined differently. FIG. 8A illustrates the case where a prediction direction is vertical. In this case, higher weighting may be given to the EL predictor for pixels in the shaded area 810a substantially on or near the border of a neighboring EL block in the vertical direction. FIG. 8B shows an example where a prediction direction is horizontal. In this case, higher weighting may be given to the EL predictor for pixels in the shaded area 810b substantially on or near the border of a neighboring EL block in the horizontal direction.

Although a shaded area is indicated in the examples described above, weighting parameters can still vary inside or outside the shaded area. The shaded area is only used as an example to illustrate a region where more weighting may be given to the EL predictor than the BL predictor in forming a final predictor. In some embodiments, the weighting factor for a certain pixel location may be determined based on the intra prediction direction and essentially the distance of the pixel location from the corresponding border pixel that is used for prediction. For example, for shorter distances for a certain pixel location, higher weighting factors might be assigned to the corresponding pixel in the EL predictor.

In additional embodiments, a weighted combination of predictors based on quantization parameters or spatial scaling ratios may be used. In determining the coefficients (e.g., the weighting parameters) for combining predictors from a base layer and an enhancement layer, a quantization parameter (QP) may also be considered. In general, the lower the QP value, the higher the quality of a predictor. As a result, if enhancement layer blocks have significantly lower QPs than that used in the base layer block, more weighting can be assigned to the EL predictor in forming the final predictor for a current enhancement layer block. For example, the QP difference between the base layer block and the enhancement layer block can be used as a factor in determining weighting parameters.

A spatial scaling ratio may also be considered when determining weighting parameters. In spatial scalability, enhancement frames have higher spatial resolutions than base layer frames. In this case, the base layer reconstructed texture has to be up-sampled accordingly before it may be used as a predictor for a corresponding enhancement layer block. Texture quality may degrade during the upsampling process. Larger scaling ratios generally result in a larger degradation in quality. Accordingly, the scaling ratio can be considered as a factor in determining weighting parameters. In general, the larger the scaling ratio, the more weight should be assigned to the EL predictor in generating a final predictor.

For the techniques thus far described, the weighting parameters can be determined or derived implicitly depending on certain conditions or contexts. In this manner, additional signaling, from encoder to decoder, for the weighting parameters may not be needed when both encoder and decoder use the same scheme to derive weighting parameters.

As described above, the conditions or contexts used to implicitly derive weighting parameters may include intra prediction direction (or intra mode), distance of a pixel location from the corresponding border pixel used for prediction, base layer QP and enhancement layer QP, as well as spatial scaling ratio between different layers. Other factors may also be used such as motion vector differences, block size, etc.

As an alternative to implicit derivation of weighting parameters, an encoder can also signal some information to a decoder for determining the weighting parameters. For example, an encoder may signal coordinates in the current block to indicate how weighting parameters should be calculated.

Figure 9:
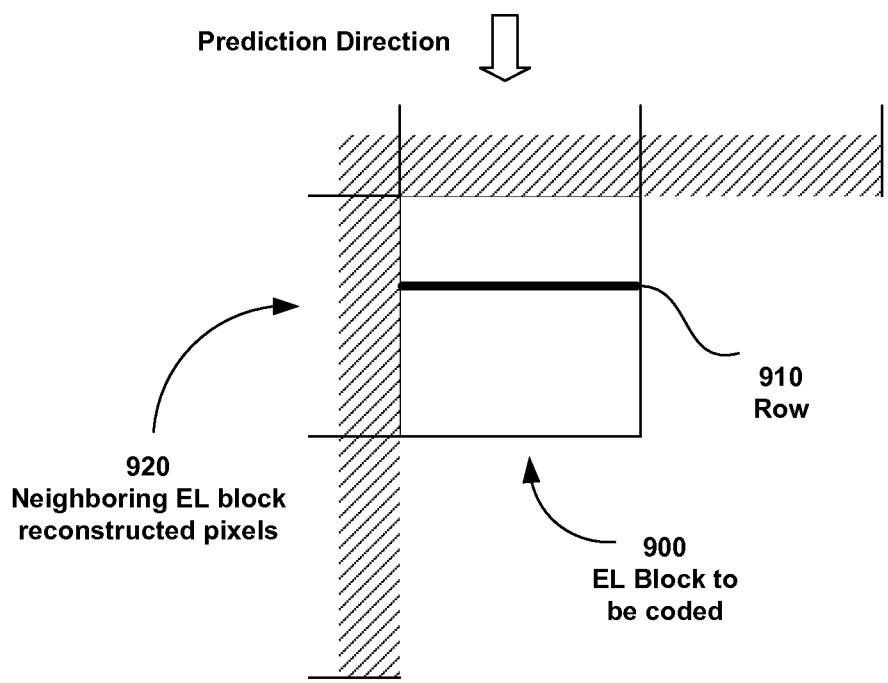
FIG. 9 is a diagram of an illustrative current enhancement block to be coded, where weighting parameters vary based on a prediction direction.

An example is provided in FIG. 9. When the intra prediction direction is vertical, a row coordinate 910 may be signaled to a decoder which indicates the location where equal weighting (e.g. 0.5) is assigned between the EL predictor and the BL predictor. Assume that the top row has a weighting of 1 from the EL predictor (i.e. a weighting of 0 from BL) and bottom row has a weighting of 1 from the BL predictor (i.e. a weighting of 0 from EL), weighting parameters for all other pixel locations inside the current enhancement layer block 900 can be interpolated accordingly based on a certain scheme, e.g. linear interpolation. The same technique can be applied when the prediction direction is horizontal. Such an idea can be extended to two dimensional cases. In some embodiments, both a row and a column coordinate may be signaled to a decoder so that the interpolation of weighting parameters is performed in a two-dimensional manner. In some embodiments, the row and/or column coordinate does not indicate the point at which the weighing given to the BL predictor and EL predictor are even, but instead may indicate the point at which the weighting for either the BL predictor or EL predictor is to form the entire basis for the final predictor. In such cases, the weights assigned to the remainder of the positions may be inferred in a similar manner.

Figure 10:
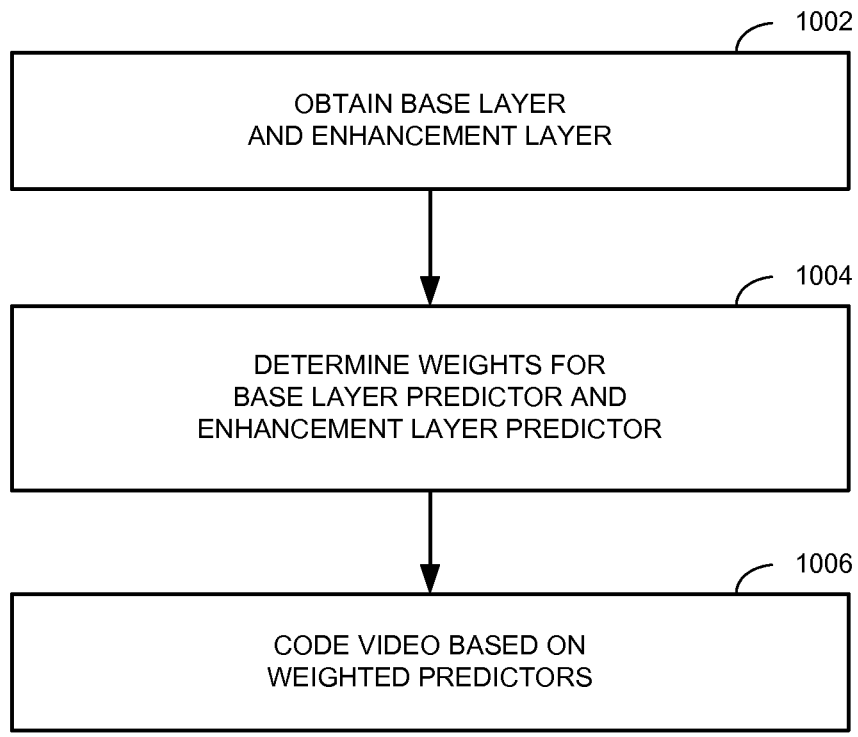
FIG. 10 is a flow diagram of an illustrative method for coding video using weighted base layer predictors and enhancement layer predictors.

Turning now to FIG. 10, an illustrative process for coding video will be described. The process may be implemented in one or more of the devices described herein, such as the source device 12 or the destination device 14.

The process begins at block 1002 where a first layer of the digital video and a second layer of the digital video are received. When implemented by a destination device 14 or some other decoder, the layers may be transmitted as digital signals through wired and/or wireless means (e.g., USB, PSTN, Ethernet, cellular, satellite, WiFi, Bluetooth, etc.). The layers may be received separately or as part of the same transmission. In some embodiments, the layers may be received directly from the source device 12, or from the source device via one or more intermediaries. Layers or portions thereof may also be received from multiple source devices. The receiving process may also include storing the received layers in memory.

In some embodiments, the process may be implemented by a source device 12 or some other encoder. In some cases, digital video including a first layer and a second layer may be obtained from memory (e.g., video stored on disk, DVD, Blue-ray, etc.). The memory may be included in the device implementing the process, or the memory may be a separate device (e.g., networked storage) that is accessible to the device implementing the method. In some embodiments, the digital video may be obtained from a sensor (e.g., camera).

At block 1004, the device implementing the process can determine weights for predictors associated with the first layer (e.g., base layer predictors) and for predictors associated with the second layer (e.g., enhancement layer predictors). For example, a destination device 14 may be decoding an enhancement layer block from a particular frame of the video based on weighted EL predictors and BL predictors. A neighboring EL block may have already been decoded. For a pixel near the neighboring block, the decoder may assign a greater weight to the EL predictor for that pixel than to the corresponding BL predictor (e.g., the collocated predictor in the base layer). For a pixel that is far from the previously decoded neighboring EL block, the decoder may assign a greater weight to the BL predictor corresponding to the pixel than to the EL predictor. An illustrative process for assigning weights to EL and BL predictors based on pixel location is described below with respect to FIG. 11. Other factors may also be considered when determining weights. For example, the prediction direction may be considered. In such cases, EL predictors associated with pixels that are close to a neighboring block but which are not in line with the current prediction direction may not necessarily be assigned a weight that is greater than the corresponding BL predictor. Other factors that may be considered include QP values, spatial scaling ratios, and the like. An illustrative process for assigning weights to EL and BL predictors based on EL and BL characteristics is described below with respect to FIG. 12.

At block 1006, the device implementing the process can code enhancement layer video units (e.g., blocks or pixels) based on the weighted predictors determined in block 1004. For example, according to equations (1) and (2) described above, a final predictor used to decode a particular enhancement layer pixel may be based on the product of the EL predictor corresponding to the pixel and the weight associated with the EL predictor, and also on the product BL predictor corresponding to the pixel and the weight associated with the BL predictor. The respective weighted predictors may be summed to provide a final predictor for the particular pixel.

Figure 11:
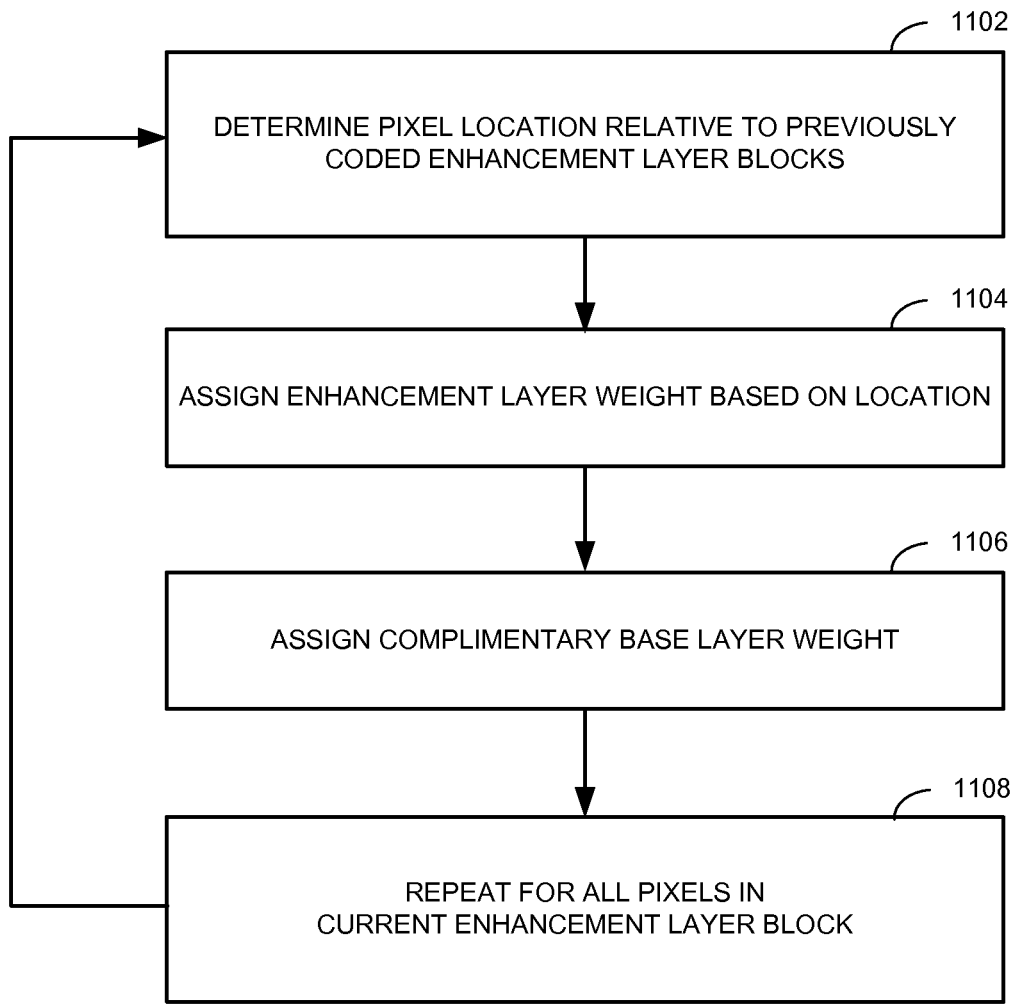
FIG. 11 is a flow diagram of an illustrative method for weighting and combining base layer predictors and enhancement layer predictors based on pixel location.

FIG. 11 illustrates a process for assigning weights to EL and BL predictors based on pixel location with a EL block or relative to previously coded neighboring EL blocks. The process may be implemented in one or more of the devices described herein, such as the video encoder 20 source device 12 or the video decoder of the destination device 14.

The process begins at block 1102, where the location of a particular pixel in the EL is determined. In particular, the distance from that location to a pixel in a previously coded EL block (e.g., an EL block that is adjacent to the EL block currently being coed), in the prediction direction used for the current EL block, can be inversely proportional to the weight given to the EL predictor.

At block 1104, the device executing the process can assign a weight to the EL predictor for the current pixel (or row, or column) based on the location and distance from previously coded EL blocks, as determined above. Illustratively, the weight assigned to the EL predictor may be close to or equal to 1 where the current pixel a direct neighbor to the previously coded pixel in the prediction direction. The EL predictor may get smaller or approach zero as the distance between the current pixel and the previously coded pixel in the prediction direction increases.

At block 1106, the device executing the process can assign a weight to the BL predictor based on the weight assigned to the EL predictor. Illustratively, the weights assigned to the EL predictor and BL predictor for any pixel may sum to a constant, such as 1. In some embodiments, the weight of the BL predictor is assigned based on the location of the current EL pixel, and the weight assigned to the EL predictor is based on the weight assigned to the BL predictor.

At block 1108, the device executing the process can repeat the process of determining pixel location and assigning weights based on that location for each pixel in the current EL block.

Figure 12:
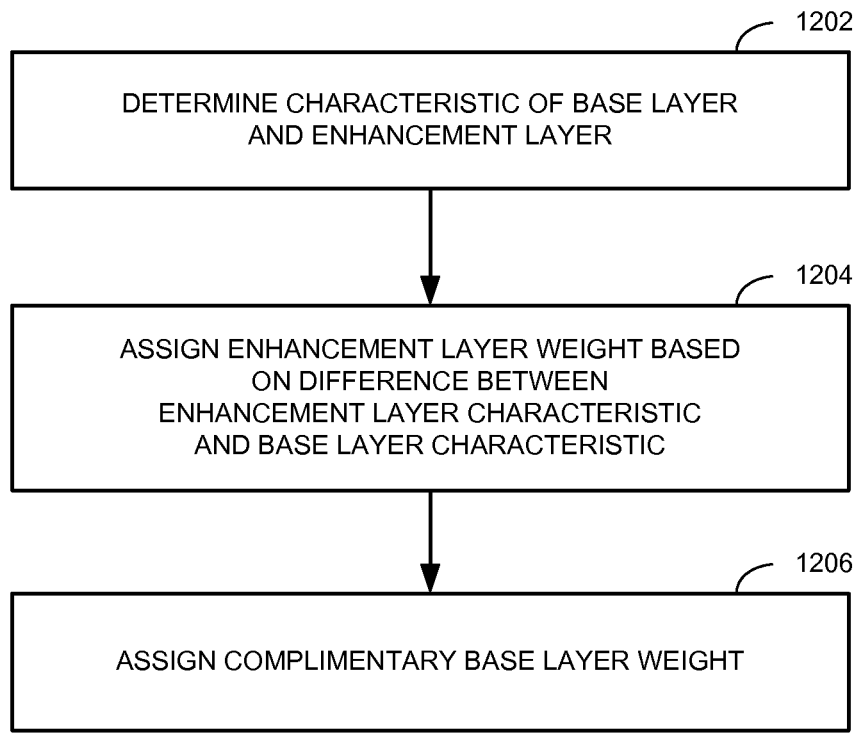
FIG. 12 is a flow diagram of an illustrative method for weighting and combining base layer predictors and enhancement layer predictors based on particular characteristics of the base layer and enhancement layer.

FIG. 12 illustrates a process for determining or assigning BL and EL predictor weights based on characteristics of the base layer and enhancement layer. The process may be implemented in one or more of the devices described herein, such as the source device 12 or the destination device 14.

The process begins at block 1202 where the relevant characteristic of the base layer and enhancement layer is determined. The characteristic may be the quantization parameter, scaling factor, or some other characteristic relevant to weighting predictors.

At block 1204, the weight of the EL predictor is determined or assigned based on the characteristics determined above. For example, a relatively large EL predictor weight may be assigned if the difference between the quantization parameters or scaling factors of the enhancement layer and base layer is large. Such a large difference can indicate that previously coded EL blocks provide better predictors for the current EL block than a BL block because, e.g., the quality of the BL block may be significantly lower than the quality of EL blocks.

At block 1206, the device executing the process can assign a weight to the BL predictor based on the weight assigned to the EL predictor. Illustratively, the weights assigned to the EL predictor and BL predictor may sum to a constant, such as 1. In some embodiments, the weight of the BL predictor is assigned based on the characteristics of the EL block and BL block, and the weight assigned to the EL predictor is based on the weight assigned to the BL predictor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for coding digital video, the apparatus comprising:
   a memory configured to store video information associated with a base layer and a corresponding enhancement layer; and
   a processor in communication with the memory, the processor configured to:
      determine a first weight associated with a first video unit in the base layer and a second weight associated with a second video unit in a frame of the enhancement layer, wherein the second weight is determined based at least in part on a spatial distance between (1) a current video unit of a current enhancement layer block in the frame of the enhancement layer and (2) a border of a neighboring enhancement layer block in a prediction direction; and
      code the current video unit using an inter-layer prediction based at least in part on the first weight, and an intra-layer prediction based at least in part on the second weight.

2. The apparatus of claim 1, wherein at least one of the first and second weights is not equal to 1.

3. The apparatus of claim 1, wherein the processor is further configured to code the current video unit in the frame of the enhancement layer based at least in part on a final predictor, and wherein the final predictor comprises a combination of a base layer predictor weighted according to the first weight and an enhancement layer predictor weighted according to the second weight.

4. The apparatus of claim 3, wherein the first weight and the second weight sum to a predetermined constant for all base layer predictors and enhancement layer predictors combined to determine final predictors for the current enhancement layer block.

5. The apparatus of claim 1, wherein the second weight is greater than the first weight for enhancement layer video units substantially adjacent spatially to previously coded enhancement layer blocks in the prediction direction.

6. The apparatus of claim 1, wherein the first weight is greater than the second weight for enhancement layer video units spatially farthest from previously coded enhancement layer blocks in the prediction direction.

7. The apparatus of claim 1, wherein the video information comprises one or more of an intra prediction direction, a pixel location, a quantization parameter, and a spatial scaling ratio.

8. The apparatus of claim 7, wherein the second weight is determined as a function of both a quantization parameter of the base layer, QP1, and a quantization parameter of the enhancement layer, QP2.

9. The apparatus of claim 8, wherein the second weight increases as the value of QP1-QP2 increases.

10. The apparatus of claim 7, wherein the second weight is determined as a function of the spatial scaling ratio.

11. The apparatus of claim 10, wherein the second weight increases as the spatial scaling ratio increases.

12. The apparatus of claim 1, wherein the video information does not comprise the first and second weights.

13. The apparatus of claim 1, wherein the video information comprises weighting data regarding the first and second weights.

14. The apparatus of claim 13, wherein the weighting data comprises a location within the current enhancement layer block at which the first weight and the second weight are equal.

15. The apparatus of claim 14, wherein the processor is further configured to determine the first and second weights for multiple video units associated with the current enhancement layer block based at least in part on the location at which the first and second weights are equal.

16. The apparatus of claim 1, wherein coding digital video comprises encoding digital video.

17. The apparatus of claim 1, wherein coding digital video comprises decoding digital video.

18. The apparatus of claim 1, wherein the second video unit comprises a pixel in the neighboring enhancement layer block.

19. The apparatus of claim 1, wherein a first value for the second weight, determined based on the spatial distance between the current video unit and the border of the neighboring enhancement layer block in the prediction direction, is greater than a second value for the second weight, determined based on a second spatial distance between a second current video unit and the border of the neighboring enhancement layer block in the prediction direction, and wherein the first value is greater than the second value due to the second spatial distance being greater than the spatial distance.

20. A method of coding digital video, the method comprising:
   obtaining video information associated with a base layer and a corresponding enhancement layer;
   determining a first weight associated with a first video unit in the base layer and a second weight associated with a second video unit in a frame of the enhancement layer, wherein the second weight is determined based at least in part on a spatial distance between (1) a current video unit of a current enhancement layer block in the frame of the enhancement layer and (2) a border of a neighboring enhancement layer block in a prediction direction; and
   coding the current video unit using an inter-layer prediction based at least in part on the first weight, and an intra-layer prediction based at least in part on the second weight.

21. The method of claim 20, wherein coding the current video unit in the frame of the enhancement layer is based at least in part on a final predictor, and wherein the final predictor comprises a combination of a base layer predictor weighted according to the first weight and an enhancement layer predictor weighted according to the second weight.

22. The method of claim 21, wherein the first weight and the second weight sum to a predetermined constant for all base layer predictors and enhancement layer predictors combined to determine final predictors for the current enhancement layer block.

23. The method of claim 20, wherein the second weight is greater than the first weight for enhancement layer video units substantially adjacent to previously coded enhancement layer blocks.

24. The method of claim 20, wherein the first weight is greater than the second weight for enhancement layer video units farthest from previously coded enhancement layer blocks.

25. The method of claim 20, wherein the video information comprises one or more of an intra prediction direction, a pixel location, a quantization parameter, and a spatial scaling ratio.

26. The method of claim 25, wherein the second weight is determined as a function of both a quantization parameter of the base layer, QP1, and a quantization parameter of the enhancement layer, QP2.

27. The method of claim 26, wherein the second weight increases as the value of QP1-QP2 increases.

28. The method of claim 25, wherein the second weight is determined as a function of the spatial scaling ratio.

29. The method of claim 28, wherein the second weight increases as the spatial scaling ratio increases.

30. The method of claim 20, wherein the video information does not comprise the first and second weights.

31. The method of claim 20, wherein the video information comprises weighting data regarding the first and second weights.

32. The method of claim 31, wherein the weighting data comprises a location within the current enhancement layer block at which the first weight and the second weight are equal.

33. The method of claim 32 further comprising determining the first and second weights for multiple video units associated with the current enhancement layer block based at least in part on the location at which the first and second weights are equal.

34. The method of claim 20, wherein the second video unit comprises a pixel in the neighboring enhancement layer block.

35. The method of claim 20, wherein a first value for the second weight, determined based on the spatial distance between the current video unit and the border of the neighboring enhancement layer block in the prediction direction, is greater than a second value for the second weight, determined based on a second spatial distance between a second current video unit and the border of the neighboring enhancement layer block in the prediction direction, and wherein the first value is greater than the second value due to the second spatial distance being greater than the spatial distance.

36. A non-transitory computer readable storage medium comprising instructions executable by a processor of an apparatus, the instructions causing the apparatus to:
   obtain video information associated with a base layer and a corresponding enhancement layer;
   determine a first weight associated with a first video unit in the base layer and a second weight associated with a second video unit in a frame of the enhancement layer, wherein the second weight is determined based at least in part on a spatial distance between (1) a current video unit of a current enhancement layer block in the frame of the enhancement layer and (2) a border of a neighboring enhancement layer block in a prediction direction; and
   coding the current video unit using an inter-layer prediction based at least in part on the first weight, and an intra-layer prediction based at least in part on the second weight.

37. An apparatus for coding video, the apparatus comprising:
   means for obtaining video information associated with a base layer and a corresponding enhancement layer;
   means for determining a first weight associated with a first video unit in the base layer and a second weight associated with a second video unit in a frame of the enhancement layer, wherein the second weight is determined based at least in part on a spatial distance between (1) a current video unit of a current enhancement layer block in the frame of the enhancement layer and (2) a border of a neighboring enhancement layer block in a prediction direction; and means for coding the current video unit using an inter-layer prediction based at least in part on the first weight, and an intra-layer prediction based at least in part on the second weight.

\* \* \* \* \*